US012639512B2

(12) United States Patent
Silavong et al.

(10) Patent No.: US 12,639,512 B2
(45) Date of Patent: May 26, 2026

(54) SYSTEMS AND METHODS FOR SEEDED NEURAL TOPIC MODELING

(71) Applicant: JPMORGAN CHASE BANK, N.A.,
New York, NY (US)

(72) Inventors: Fanny Silavong, London (GB); Sae Young Moon, Edmonton (CA); Antonios Georgiadis, London (GB)

(73) Assignee: JPMORGAN CHASE BANK, N.A.,
New York, NY (US)

( * ) Notice: Subject to any disclaimer, the term of this patent is extended or adjusted under 35 U.S.C. 154(b) by 162 days.

(21) Appl. No.: 18/442,982

(22) Filed: Feb. 15, 2024

(65) Prior Publication Data

US 2024/0281603 A1 Aug. 22, 2024

(30) Foreign Application Priority Data

Feb. 16, 2023 (GR) .............................. 20230100129

(51) Int. Cl.
*G06F 40/216* (2020.01)
*G06F 40/284* (2020.01)
*G06F 40/40* (2020.01)
(52) U.S. Cl.
CPC .......... *G06F 40/216* (2020.01); *G06F 40/284* (2020.01); *G06F 40/40* (2020.01)
(58) Field of Classification Search
CPC ....... G06F 40/216; G06F 40/284; G06F 40/40
See application file for complete search history.

(56) References Cited

U.S. PATENT DOCUMENTS 6,477,551 B1 * 11/2002 Johnson ................ G06F 40/284
707/999.005
7,117,432 B1 * 10/2006 Shanahan ............. G06F 16/353
715/236

(Continued)

OTHER PUBLICATIONS

International Search Report and Written Opinion of the International Searching Authority, dated Jun. 17, 2024, from corresponding International Application No. PCT/US2024/016227.

(Continued)

*Primary Examiner* — Darioush Agahi
(74) *Attorney, Agent, or Firm* — GREENBERG TRAURIG LLP

(57) ABSTRACT

A method may include: receiving a seed topic word distribution; receiving a corpus of documents; generating bag of words representations for the corpus of documents; converting the corpus of documents to vector representations; training a topic modeling system using the seed topic word distribution and concatenated bag of words representations and the vector representations resulting in a topic word distribution and a document word distribution; generating a plurality of new generated topics based on the topic word distribution; precomputing a topic word distribution penalty and a topic word distribution reward for the plurality of topics; penalizing the topic modeling system in response to a divergence and rewarding the topic modeling system in response to a similarity; determining a total loss from a neural network loss, the topic word distribution penalty, and the topic word distribution reward; and training the topic modeling system based on the total loss.

11 Claims, 3 Drawing Sheets

(56) References Cited

U.S. PATENT DOCUMENTS

| 9,043,247 | B1 * | 5/2015 | Hart | G06V 30/40 |
| | | | | 706/12 |
| 10,049,148 | B1 * | 8/2018 | Fang | G06F 16/23 |
| 2014/0201199 | A1 * | 7/2014 | Hajaj | G06F 16/9535 |
| | | | | 707/723 |
| 2014/0379719 | A1 * | 12/2014 | Wang | G06F 16/35 |
| | | | | 707/738 |
| 2018/0307680 | A1 * | 10/2018 | Wu | G06F 16/3347 |
| 2018/0329985 | A1 * | 11/2018 | Bao | G06F 16/3334 |
| 2020/0110916 | A1 * | 4/2020 | Chang | G06F 40/30 |
| 2021/0097571 | A1 * | 4/2021 | Jin | G06F 9/547 |
| 2021/0103608 | A1 | 4/2021 | Ganti et al. | |
| 2021/0117777 | A1 * | 4/2021 | Mattarella-Micke | |
| | | | | G06N 3/044 |
| 2021/0157872 | A1 * | 5/2021 | David | G06F 40/279 |
| 2021/0174958 | A1 * | 6/2021 | Drake | G16H 50/20 |
| 2021/0303634 | A1 * | 9/2021 | Choi | G06F 16/90332 |
| 2021/0312904 | A1 * | 10/2021 | Shukla | G06F 16/3329 |
| 2022/0121490 | A1 * | 4/2022 | Yokoyama | G06F 9/505 |
| 2023/0169271 | A1 * | 6/2023 | Shailabh | G06F 40/40 |
| | | | | 704/9 |

OTHER PUBLICATIONS

Zhang, Yu; et al, "Effetive Seed-Guided Topic Discovery by Integrating Multiple Types of Contexts", Cornell University Library, Jan. 11, 2023.

* cited by examiner

SYSTEMS AND METHODS FOR SEEDED NEURAL TOPIC MODELING

RELATED APPLICATIONS

This application claims priority to, and the benefit of, Greek Patent Application Number 20230100129 filed Feb. 16, 2023, the disclosure of which is hereby incorporated, by reference, in its entirety.

BACKGROUND OF THE INVENTION

1. Field of the Invention

Embodiments relate generally to systems and methods for seeded neural topic modeling.

2. Description of the Related Art

Topic modeling techniques have historically been very popular when dealing with large text corpora, especially since they do not require labelled data. In banking, for example, this form of unsupervised analysis is frequently used for analyzing customer feedback, improving fraud detection, identifying market trends, optimizing complaint resolution and augmenting sentiment analysis systems. When used on data "in the wild," however, both traditional topic modeling techniques, such as Latent Dirichlet Allocation ("LDA") as well as the more recent Contextualized Topic Models ("CTM"), often give poor results and require significant specialist tuning and post-processing. Few existing open-source solutions allow the users to inform (or "seed") their topics effectively, and the majority yield results which are unfit to be used in production.

SUMMARY OF THE INVENTION

Systems and methods for seeded neural topic modeling are disclosed. For example, embodiments may introduce a seed to a CTM architecture resulting in an effective semi-supervised topic modeling framework that yields cleaner, more domain-relevant topics when compared to the state-of-the-art open-source alternatives.

According to an embodiment, a method may include: (1) receiving, by a computer program, a seed topic word distribution comprising a plurality of seed topic words and having a plurality of topics; (2) receiving, by the computer program, a corpus of documents; (3) generating, by the computer program, bag of words representations for the corpus of documents; (4) converting, by the computer program, the corpus of documents to vector representations; (5) concatenating, by the computer program, the bag of words representations and the vector representations; (6) training, by the computer program, a topic modeling system using the seed topic word distribution and the concatenated bag of words representations and the vector representations resulting in a topic word distribution and a document word distribution; (7) generating, by the computer program, a plurality of new generated topics based on the topic word distribution; (8) precomputing, by the computer program, a topic word distribution penalty and a topic word distribution reward for the plurality of topics; (9) penalizing, by the computer program, the topic modeling system in response to the plurality of new generated topics diverging from the seed topic words and rewarding, by the computer program, the topic modeling system in response to the plurality of new generated topics being similar to the seed topic words; (10)

determining, by the computer program, a total loss from a neural network loss, the topic word distribution penalty, and the topic word distribution reward; and (11) training, by the computer program, the topic modeling system based on the total loss.

In one embodiment, the method may also include receiving, by the computer program, a number of unseeded topics.

In one embodiment, the method may also include lemmatizing bag of words tokens for the bag of word representations and the seed topic words; and filtering, by the computer program, each bag of word token.

In one embodiment, each of the bag of words tokens may be filtered according to a number of documents in the corpus of documents that a word associated with bag of word token appears, may be filtered according a percentage of documents in the corpus of documents that a word associated with bag of word token appears, may be filtered by removing seed topic words having a cosine similarity that may be lower than a threshold when compared to each seed topic word, etc.

In one embodiment, the threshold may be user defined.

In one embodiment, the method may also include removing a subset from the seed topic words from the seed topic words based on an entity attribution and/or a part of speech tag.

In one embodiment, the topic word distribution penalty and the topic word distribution reward have different scalings in the total loss.

In one embodiment, the topic modeling system may be trained for a plurality of epochs.

In one embodiment, the neural network loss may be from a Contextualized Topic Models loss function.

According to another embodiment, a non-transitory computer readable storage medium may include instructions stored thereon, which when read and executed by one or more computer processors, cause the one or more computer processors to perform steps comprising: receiving a seed topic word distribution comprising a plurality of seed topic words and having a plurality of topics; receiving a corpus of documents; generating bag of words representations for the corpus of documents; converting the corpus of documents to vector representations; concatenating the bag of words representations and the vector representations; training a topic modeling system using the seed topic word distribution and the concatenated bag of words representations and the vector representations resulting in a topic word distribution and a document word distribution; generating a plurality of new generated topics based on the topic word distribution; precomputing a topic word distribution penalty and a topic word distribution reward for the plurality of topics; penalizing the topic modeling system in response to the plurality of new generated topics diverging from the seed topic words and rewarding the topic modeling system in response to the plurality of new generated topics being similar to the seed topic words; determining a total loss from a neural network loss, the topic word distribution penalty, and the topic word distribution reward; and training the topic modeling system based on the total loss.

In one embodiment, the non-transitory computer readable storage medium may also include instructions stored thereon, which when read and executed by one or more computer processors, cause the one or more computer processors to receive a number of unseeded topics.

In one embodiment, the non-transitory computer readable storage medium may also include instructions stored thereon, which when read and executed by one or more computer processors, cause the one or more computer processors to lemmatize the bag of words tokens for the bag of word representations and the seed topic words; and filter each bag of word token.

In one embodiment, each of the bag of words tokens may be filtered according to a number of documents in the corpus of documents that a word associated with bag of word token appears, may be filtered according a percentage of documents in the corpus of documents that a word associated with bag of word token appears, may be filtered by removing seed topic words having a cosine similarity that is lower than a threshold when compared to each seed topic word, wherein the threshold may be user defined, etc.

In one embodiment, the non-transitory computer readable storage medium may also include instructions stored thereon, which when read and executed by one or more computer processors, cause the one or more computer processors to remove a subset from the seed topic words from the seed topic words based on an entity attribution and/or a part of speech tag.

In one embodiment, the topic word distribution penalty and the topic word distribution reward have different scalings in the total loss.

In one embodiment, the topic modeling system may be trained for a plurality of epochs.

According to an embodiment, a method for seeded neural topic modeling may include: (1) receiving, by a computer program, a plurality of topic seed words (i.e. a seed topic word distribution) and a corpus of documents in text form and optionally, a number of unseeded topics K; (2) generating, by the computer program, a vocabulary comprising a bag of words for the corpus of documents; (3) pre-processing, by the computer program, the bag of words; (4) training, by the computer program, a topic modeling system using the topic seed words resulting in a topic word distribution and a document word distribution; (5) comparing, by the computer program, the N generated topics using the seed topic word distribution; (6) penalizing, by the computer program, the topic modeling system in response to the N generated topics diverging from the seed topic words; (7) rewarding, by the computer program, the topic modeling system in response to the N generated topics being similar to the seed topic words; (8) determining, by the computer program, a total loss from a neural network loss (reconstruction loss), a penalty loss from the penalizing, and a reward loss from the rewarding; and (9) training, by the computer program, the topic modeling system based on the total loss.

In one embodiment, the step of pre-processing the bag of words may include: lemmatizing bag of words tokens and the seed topic words to reduce the vocabulary as all tokens become the lemma; and reducing, by the computer program, a size of the vocabulary and the bag of words by filtering each bag of word token.

In one embodiment, the step of pre-processing the bag of words may include: removing topic seed words based on an entity attribution and/or a part of speech tag.

In one embodiment, each of the bag of words tokens may be filtered according to a number of documents in the document corpus the word associated with bag of word token appears.

In one embodiment, each of the bag of words tokens may be filtered according to a percentage of documents in the document corpus the word associated with bag of word token appears.

In one embodiment, each of the bag of words tokens may be filtered by removing words having a cosine similarity of the BERT, Word2Vec, or Glove embedding of that word that is lower than a threshold when compared to each seed topic word across all seed topics.

In one embodiment, the threshold may be user defined.

In one embodiment, the step of penalizing and rewarding are two separate factors and have a different scaling in the final loss function.

In one embodiment, the rewarding may be promoted more than the penalizing.

In one embodiment, the penalizing may be promoted more than the rewarding.

In one embodiment, the rewarding and the penalizing may scale at the same rate.

In one embodiment, the topic modeling system may be trained for a plurality of epochs.

In one embodiment, the neural network loss may be from a Contextualized Topic Models loss function.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
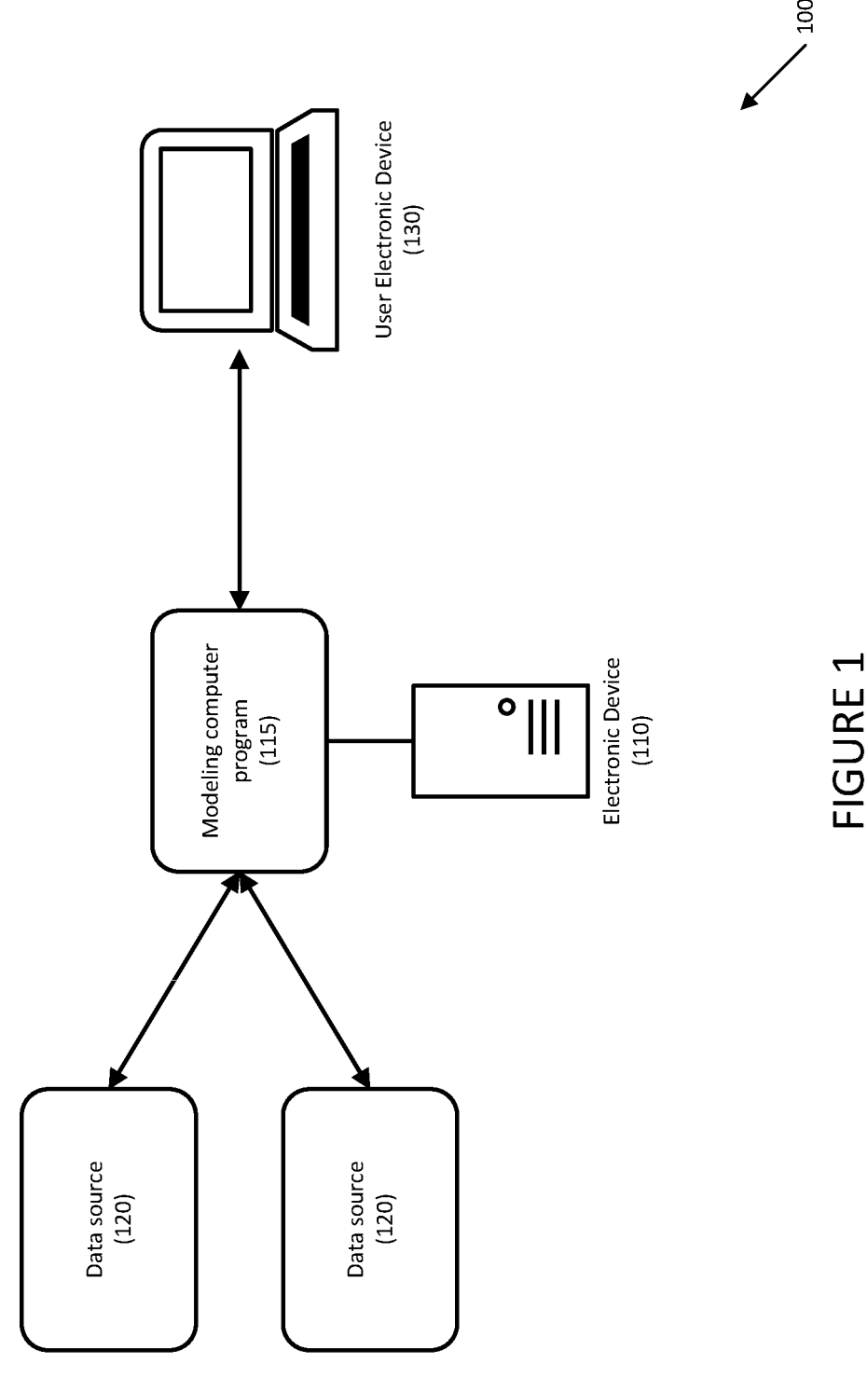
FIG. 1 depicts a system for seeded neural topic modeling according to an embodiment.

Embodiments relate generally to systems and methods for seeded neural topic modeling.

Embodiments may introduce a seed to a Neural Topic Model architecture resulting in an effective semi-supervised topic modeling framework that yields cleaner, more domain-relevant topics when compared to the state-of-the-art open-source alternatives. Embodiments may be used with Neural Topic Models and Contextualized Topic Models.

Embodiments may leverage a list of seed words by topic to guide the neural topic modeling process to generate domain-relevant topic words and domain of interest.

Embodiments may surface un-specified topics in addition to the seeded topics.

To make topic modeling viable for production-level performance, the framework disclosed herein may provide the following:

1. Neural seeding: Seeding is the process of initializing the topic modeling algorithms with a number of known, usually subject matter expert (SME)-curated topics. Embodiments may use, for example, a neural topic modeling architecture by defining a novel loss function. The loss function may combine concepts from the ProdLDA model and a reward and penalty factor aiming at promoting more distinctive topics based on the seed.

2. Emerging topic detection: While the framework expects users to input seeding, it may also promote learning new topics when those do not fit within the existing seed. As a result, emerging topics tend to be more distinctive and useful.

3. Taxonomy curation: Even with a great seeding mechanism, human language proposes significant challenges if one attempts to create a taxonomy. For instance, between the words "account", "payments", "card", and "loan", it is not immediately clear which ones should be used as the topic's name and which ones should be members of that topic's word distribution. This may lead to bad seeding. Embodiments may optimize the taxonomy by considering the dataset each time, and may also include actions to improve the taxonomy.

For example, embodiments may combine contextualized representations obtained from large language models with bag-of-words based on neural topic models to obtain superior performance. Intuitively, this topic model learns two key components: (1) $\beta$ which represents the topic-word distribution, and (2) $\theta$ which represents the document-word distribution. From the final $\beta$ distribution learnt, the most relevant keywords may be extracted for each topic group. From the final $\theta$ learnt, the most likely topic group each text document belongs to may be identified. The loss signal to learn these components is explained in equation 1:

$$L(\theta, \gamma | \omega) = -0.5 \sum_{j=1}^{J} \left[ \left( 1 + \log((\sigma_j)^2) \right) - (\mu_j)^2 - (\sigma_j)^2 \right] - \tag{1}$$
$$\sum_{j=1}^{J} (batchnorm(\theta_j * \beta_j) * \log(\omega_j)) +$$
$$\tau_{reward} \sum_{j=1}^{J} (\beta_j * \beta_{reward_j}) + \tau_{penalize} \sum_{j=1}^{J} (\beta_j * \beta_{penalize_j})$$

where $\theta$ is the document-topic distribution, $\beta$ is the topic-word distribution, $\gamma$ are the parameters of the neural network, w is the word distribution matrix, J is the number of topics, $\sigma$ and $\mu$ are statistics of the $\beta$ Gaussian distribution sampled from the network, $\tau_{reward}$ and $\tau_{penalise}$ are the scaling factors of the reward and penalize loss respectively, and $\beta_{reward}$ and $\beta_{penalize}$ are the reward and penalize $\beta$ that is initialized based on seeding strategy.

Embodiments input seeded words thereby guiding the model training process to retrieve keywords that are relevant to the seeded words. For example, seeded words for topic group "Rewards" could be "cash back", "bonus", "points", etc., and users may add any number of such topic groups and their corresponding seed words, as long as they would intuitively be useful for the particular dataset.

In embodiments, the number of output topic groups is equal or higher than the number of seeded topic groups. In other words, embodiments may generate topic keywords for both topic groups that are seeded and not seeded.

Embodiments may guide the model training process to retrieve keywords that are relevant to the seeded words of each seeded topic group with the loss function outlined in equation 1. The first two terms are taken from the contextualized topic modeling algorithm, and the last two terms are the seeding losses. As shown in equation 1, the model is rewarded when it learns a $\beta$ distribution that aligns closer to the $\beta_{reward}$, and penalized when it learns a $\beta$ distribution that aligns closer to the $\beta_{penalize}$.

Referring to FIG. 1, a system for seeded neural topic modeling is disclosed according to an embodiment. System 100 may include electronic device 110, which may be a server (e.g., cloud-based and/or physical), a computer (e.g., workstation, desktop, laptop, notebook, tablet, etc.), a smart device (e.g., smart phone, smart watch, etc.), an Internet of Things (IoT) appliance, etc. Electronic device 110 may execute modeling computer program 115, which may receive data from data source(s) 120.

Data sources 120 may provide documents, such as text documents. The documents may be any type of data in text form—printed publications, web articles, emails, customer reviews, chat messages, call transcripts, etc. In one embodiment, the documents may include topics that are not detectable.

Modeling computer program 115 may receive the data and may use contextual topic modelling to assign a likely topic group to the data. Modeling computer program 115 may output a filtered and/or ranked list of topics for the document.

Figure 2:
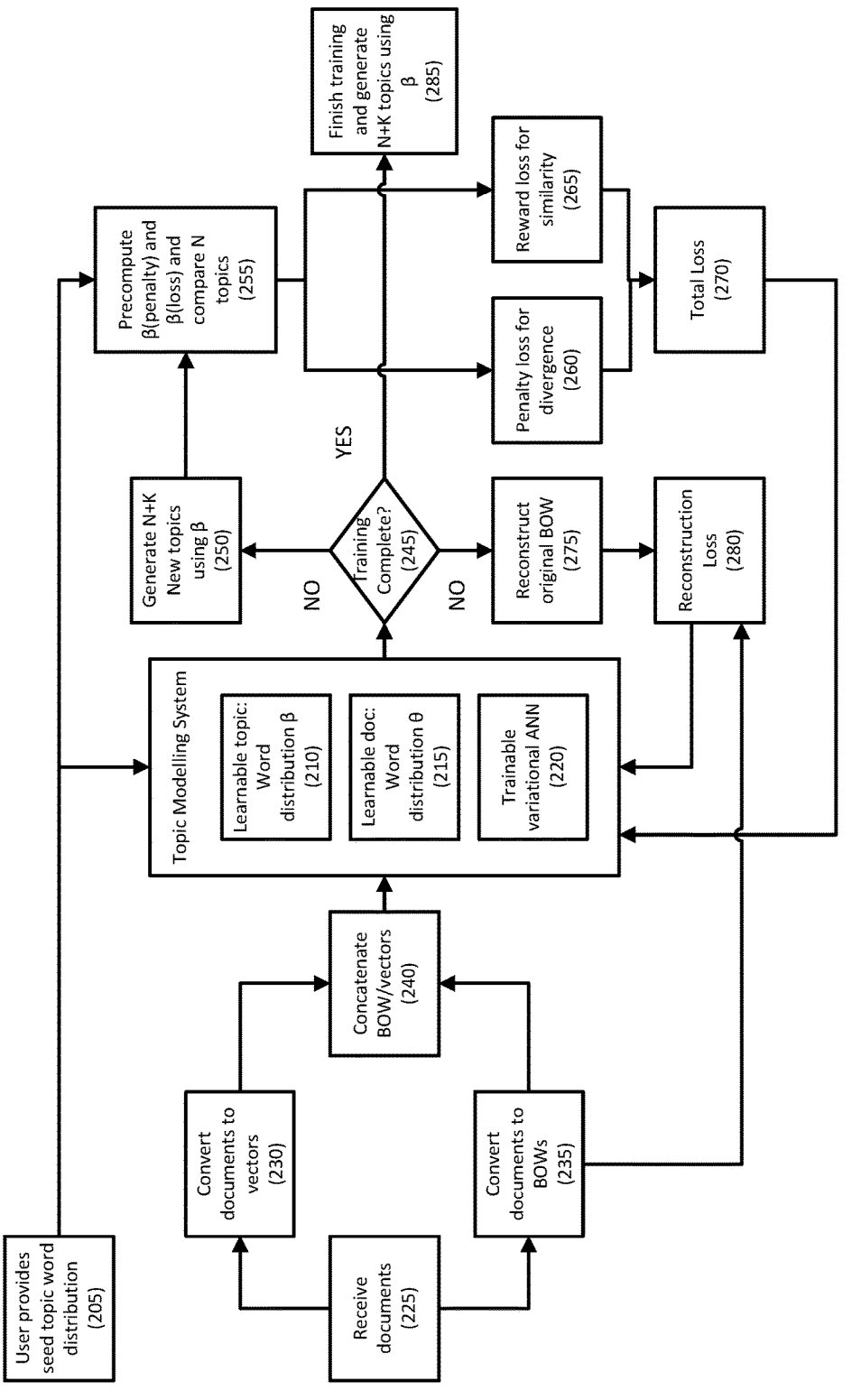
FIG. 2 depicts a method for training a topic modeling system according to one embodiment.

Referring to FIG. 2, a method for seeded neural topic modeling is disclosed according to one embodiment.

In step 205, a user may provide a seed topic word distribution $\beta'$ having a number N of topics to a computer program, such as a modeling computer program. In steps 210 and 215, a topic modelling system may identify, from the received word distribution $\beta'$, a learnable topic with a word distribution $\beta$, and a learnable document with a word distribution $\theta$. The $\beta$ distribution may be initialized as neural network parameter weights to be tuned throughout the training process, and $\theta$ distribution may be sampled from $\sigma$ and $\mu$ distributions which are generated from hidden layer outputs of the neural network.

In one embodiment, the user may also provide a number of unseeded topics.

In step 220, the topic modelling system may generate a trainable variational autoencoder neural network using $\beta$ and $\theta$.

In step 225, the computer program may receive a plurality of documents in textual form.

In step 230, the computer program may convert documents to word embedding vector representations using, for example, BERT.

In step 235, in parallel, the computer program may also convert the documents to Bag of Words (BOW) vector representations.

In step 240, the compute program may concatenate the BOW vector representations and the word embedding vector representations. The concatenation is then provided to the topic modelling system. This combined representation of the input documents may be transformed by the hidden layers of the neural network to generate $\sigma$ and $\mu$ distributions, and the $\sigma$ and $\mu$ may be transformed to sample a $\theta$ distribution. The model's $\beta$ distribution and the sampled $\theta$ distribution may be used to reconstruct the bag of word representation. This reconstructed bag-of-words may be compared with the original bag-of-words to generate a reconstruction loss.

In one embodiment, the bag of words may be preprocessed. For example, the bag of words and the seed topic words may be lemmatized to reduce the vocabulary as all tokens become the lemma. The size of the vocabulary and the bag of words may be reduced by filtering each bag of word token.

In another embodiment, a subset of the seed topic words may be removed based on an entity attribution and/or a part of speech tag.

In step 245, once training is complete (e.g., the training epochs are complete), in step 285, the computer program may generate N+K new topics using the topic: word distribution $\beta$, where K is a number of unseeded topics. The final $\beta$ provides the distribution of words in both seeded and non-seeded topic groups based on the user's configuration. This allows the computer program to identify salient keywords per topic groups analyzed. The final $\theta$ provides information to signal which topic group each document may belong to. This allows for downstream tasks, such as classifying the original document to topic groups.

If training is not complete in step 250, the computer program may generate N+K new topics using the topic: word distribution β. by taking the model's current β distribution weights. In step 255, the computer program may compare the topic: word distribution β with both β (penalize) and β (reward) to generate, in step 260, a penalty loss for divergence and in step 265, a penalty loss for similarity. In embodiments, the β(penalize) and β (reward) may be pre-computed based on the seed topic-word distribution provided by the user (β'). The β (reward) has higher value for BOW tokens that are more similar to the seed, and the β (penalize) has higher value for BOW tokens that are more divergent to the seed. This similarity value may be assigned using various methods such as cosine semantic similarity, scaling with inverse document frequency (IDF), etc. A higher reward signal may be given when the current β learnt is more similar to the β (reward), and a higher penalize signal may be given when the current β learnt is more similar to the β (penalize). For example, in step 260, a penalty loss for the first N generated Topic: Words distributions divergent from the seed may be generated, and in step 265, a penalty loss for first N generated Topic: Words distributions similar to seed may be generated.

In step 270, the computer program may generate a total loss from the penalty losses. The total loss may promote N topics similar to the seed, and K new topics divergent from the seed.

In step 275, in parallel, the computer program may also reconstruct the original Bag of Words vector representation from the output of the topic modelling system.

In step 280, the computer program may generate a reconstruction loss based on the comparison of the original Bag of Words vector representation and the reconstruction of the original Bag of Words vector representation. The reconstruction loss may be fed to the topic modelling system.

The following pseudocode outlines how the seeding components, namely $\beta_{seed}$, $\beta_{reward}$, and $\beta_{penalize}$, are initialized.

---

Algorithm 1 Calculate $\beta_{seed}$

---

$\beta_{seed} \leftarrow [\,]$
seed ← seeded tokens if exists
   for i in $n_{topics}$ do
      $\beta_{seed}[i] \leftarrow$ scale([sim(seed$_i$,b)for b in bows])
   end for

--- where sim is a similarity measurement that measures the similarity between bag-of-words token b with seed words in seed$_i$, scale is the scaling method that scales this similarity value, and bows is the bag-of-words tokens.

---

Algorithm 2 Calculate $\beta_{reward}$

---

$\beta_{reward} \leftarrow [\,]$
   for i in $n_{topics}$ do
      seed$_{curr} \leftarrow \beta_{seed}[i]$
      seed$_{others} \leftarrow \beta_{seed}[: i] + \beta_{seed}[i+ :]$
      $\beta_{reward}[i] \leftarrow$ scale((seed$_{curr}$ − seed$_{other}$) + seed$_{curr}$)
   end for

--- where $\beta_{reward}$ defines which bag-of-words tokens should be rewarded for having higher values learnt in the current β, and scale defines a scaling factor to re-weight these rewards.

Intuitively, $\beta_{reward}$ gives higher values to relevant bag-of-words tokens that are more similar to the seed words in the current topic, but less similar to seed words in other topics.

---

Algorithm 3 Calculate $\beta_{penalize}$

---

$\beta_{penalize} \leftarrow [\,]$
   for i in $n_{topics}$ do
      seed$_{curr} \leftarrow \beta_{seed}[i]$
      seed$_{others} \leftarrow \beta_{seed}[: i] + \beta_{seed}[i+ :]$
      $\beta_{penalize}[i] \leftarrow$ scale(seed$_{other}$ − seed$_{curr}$)
   end for

--- where $\beta_{penalize}$ defines which bag-of-words tokens should be penalized for having higher values learnt in the current β, and scale defines a scaling factor to re-weight these rewards. Intuitively, $\beta_{penalize}$ gives higher values to relevant bag-of-words tokens that are least similar to the seed words in the current topic, but more similar to seed words in other topics. Furthermore, one example of a scaling method could be to multiply by the Term Frequency-Inverse Document Frequency ("TF-IDF") values of the bag-of-words tokens, so higher rewards are given to more relevant tokens.

Figure 3:
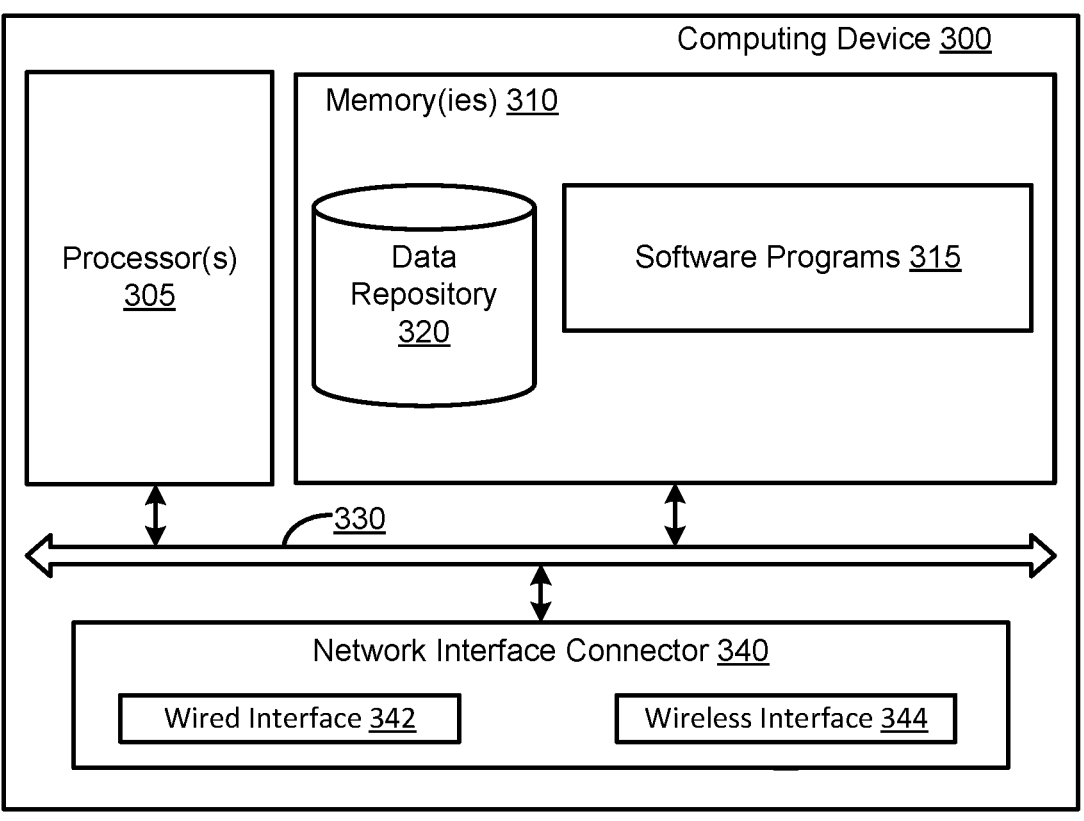
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a computer program, a seed topic word distribution comprising a plurality of seed topic words and having a plurality of topics;

receiving, by the computer program, a corpus of documents;

generating, by the computer program, bag of words representations for the corpus of documents;

converting, by the computer program, the corpus of documents to vector representations;

concatenating, by the computer program, the bag of words representations and the vector representations;

training, by the computer program, a topic modeling system using the seed topic word distribution and the concatenated bag of words representations and the vector representations resulting in a topic word distribution and a document word distribution;

lemmatizing bag of words tokens for the bag of word representations and the seed topic words;

filtering, by the computer program, each bag of word token by removing seed topic words having a cosine similarity that is lower than a threshold when compared to each seed topic word, wherein the threshold is user defined;

generating, by the computer program, a plurality of new generated topics based on the topic word distribution;

precomputing, by the computer program, a topic word distribution penalty and a topic word distribution reward for the plurality of topics;

penalizing, by the computer program, the topic modeling system in response to the plurality of new generated topics diverging from the seed topic words and rewarding, by the computer program, the topic modeling system in response to the plurality of new generated topics being similar to the seed topic words;

determining, by the computer program, a total loss from a neural network loss, the topic word distribution penalty, and the topic word distribution reward; and training, by the computer program, the topic modeling system based on the total loss.

2. The method of claim 1, further comprising:

receiving, by the computer program, a number of unseeded topics.

3. The method of claim 1, further comprising:

removing a subset from the seed topic words from the seed topic words based on an entity attribution and/or a part of speech tag.

4. The method of claim 1, wherein the topic word distribution penalty and the topic word distribution reward have different scalings in the total loss.

5. The method of claim 1, wherein the topic modeling system is trained for a plurality of epochs.

6. The method of claim 1, wherein the neural network loss is from a Contextualized Topic Models loss function.

7. A non-transitory computer readable storage medium, including instructions stored thereon, which when read and executed by one or more computer processors, cause the one or more computer processors to perform steps comprising:

receiving a seed topic word distribution comprising a plurality of seed topic words and having a plurality of topics;

receiving a corpus of documents;

generating bag of words representations for the corpus of documents;

lemmatizing bag of words tokens for the bag of word representations and the seed topic words;

filtering each bag of word token by removing seed topic words having a cosine similarity that is lower than a threshold when compared to each seed topic word, wherein the threshold is user defined;

converting the corpus of documents to vector representations;

concatenating the bag of words representations and the vector representations;

training a topic modeling system using the seed topic word distribution and the concatenated bag of words representations and the vector representations resulting in a topic word distribution and a document word distribution;

generating a plurality of new generated topics based on the topic word distribution;

precomputing a topic word distribution penalty and a topic word distribution reward for the plurality of topics;

penalizing the topic modeling system in response to the plurality of new generated topics diverging from the seed topic words and rewarding the topic modeling system in response to the plurality of new generated topics being similar to the seed topic words;

determining a total loss from a neural network loss, the topic word distribution penalty, and the topic word distribution reward; and training the topic modeling system based on the total loss.

8. The non-transitory computer readable storage medium of claim 7, further including instructions stored thereon, which when read and executed by one or more computer processors, cause the one or more computer processors to perform steps comprising:

receiving a number of unseeded topics.

9. The non-transitory computer readable storage medium of claim 7, further including instructions stored thereon, which when read and executed by one or more computer processors, cause the one or more computer processors to perform steps comprising:

removing a subset from the seed topic words from the seed topic words based on an entity attribution and/or a part of speech tag.

10. The non-transitory computer readable storage medium of claim 7, wherein the topic word distribution penalty and the topic word distribution reward have different scalings in the total loss.

11. The non-transitory computer readable storage medium of claim 7, wherein the topic modeling system is trained for a plurality of epochs.

\* \* \* \* \*